United States Patent Office 3,071,538
Patented Jan. 1, 1963

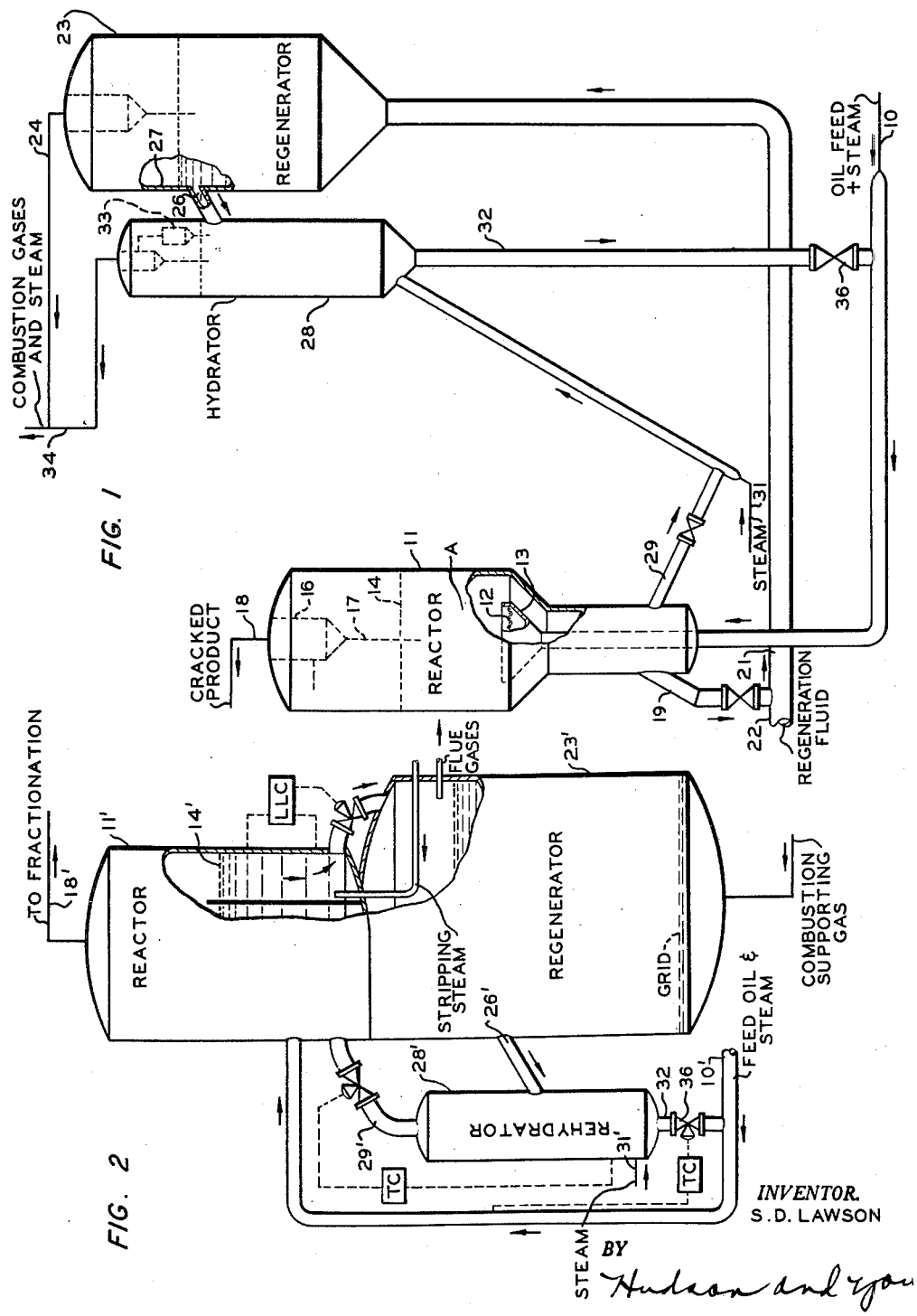

3,071,538
CATALYTIC CONVERSION
Shelby D. Lawson, Bartlesville, Okla., assignor to Phillips Petroleum Company, a corporation of Delaware
Filed July 25, 1955, Ser. No. 524,238
12 Claims. (Cl. 208—120)

This invention relates to catalytic conversion of reactant materials. In one aspect, this invention relates to a method for maintaining a conversion catalyst in a requisite state of hydration. In another aspect, this invention relates to a method wherein a catalyst to be hydrated and existing above its hydration temperature is mixed with a relatively cool body of such catalyst and hydration agent to cool the catalyst to hydration temperature and hydrate same. In another aspect, this invention relates to a hydrocarbon cracking process, including catalyst regeneration, wherein catalyst becomes dehydrated at the regeneration temperature employed, and rehydration is effected by admixing catalyst from cracking, and steam, with catalyst from regeneration to provide a resulting catalyst mixture at rehydration temperature, effecting said hydration, and passing rehydrated catalyst to said cracking.

Various conversion catalysts contain water of hydration and, when exposed to the effect of elevated temperatures, become dehydrated and, as a result, exhibit marked decrease in activity for their intended use. It then becomes necessary to effect rehydration in order that the catalyst can be reused on an economic basis. In the catalytic cracking of hydrocarbons, such as gas oil cracking in presence of a clay type catalyst, the cracking temperature is generally in the range of from about 890 to 925° F. and is generally employed in conjunction with catalyst regeneration at a higher temperature level such as from 1050 to 1090° F., under which conditions catalyst is alternately contacted with reactants and regenerated to provide continuous operation over extended periods. Most clay type catalysts, when so employed, are utilized in a hydrated form, i.e., containing from about 0.8 to 1.0 percent of water of hydration. However, when subjected to regeneration, generally at about 1050 to 1090° F. to burn combustible materials from the catalyst surfaces, undue catalyst dehydration is effected with concomitant loss in quality of the catalyst for reuse. In the use of such clay type catalysts, it has been the practice in the art to prevent such dehydration by lowering the regeneration temperature to below the temperature level for optimum operation or to add a sufficient amount of rehydrating agent, e.g., steam, to the catalyst withdrawn from regeneration to cool the same to rehydration temperature and then effect rehydration, either prior to returning the said catalyst to the cracking step, or so as to effect hydration in the cracking step proper. These procedures are disadvantageous in that, when reducing regeneration temperature to a level at which dehydration of catalyst does not occur, the regeneration is correspondingly less efficient, requiring longer regeneration time with less satisfactory removal of combustible materials from the catalyst surface, and when rehydrating with steam alone prior to introduction of catalyst from regeneration into the cracking zone, or in the cracking zone, unduly large proportions of hydrating agent such as steam are required.

My invention is concerned with rehydration of catalyst exposed at temperatures, above hydration temperature and having become thereby dehydrated, without the need for lowering such high temperature or for using ordinarily large requisite amounts of rehydration agent. My invention is advantageously applied to natural catalysts employed in hydrocarbon cracking processes.

An object of this invention is to provide for catalytic conversion of reactant materials. Another object is to provide for maintaining a catalyst, employed in a requisite state of hydration in a conversion process, in a suitable hydrated state over a prolonged period of use. Another object is to provide a catalytic hydrocarbon cracking process including regeneration wherein, at regeneration temperatures employed, catalyst dehydration takes place and wherein rehydration is effected subsequent to regeneration but prior to returning regenerated catalyst to the cracking step, without utilizing large amounts of rehydrating agent ordinarily required when such rehydration is effected. Another object is to provide for cracking sulfur-bearing hydrocarbon stocks, such as gas oils and residual oils, in presence of natural cracking catalyst, with catalyst regeneration, without need for reducing regeneration temperature to below catalyst dehydration temperature and without need for unduly large amounts of steam as rehydrating agent, prior to, or in, the cracking step.

Other aspects and objects of this invention and its several related particulars are evident from a perusal of this disclosure, the drawings, and the appended claims.

In accordance with this invention, a catalyst to be hydrated and existing above its hydration temperature is cooled to a hydration temperature level by admixing therewith a relatively cool body of such catalyst, the latter in any desired state of hydration, and to provide resulting catalyst mixture at hydration temperature, and is then hydrated; this invention, in accordance with one concept providing an improvement in the conversion of reactant materials in presence of a catalyst containing water of hydration, wherein the catalyst is periodically subjected to combustion regeneration at above conversion temperature to remove combustible materials from its surfaces and is concomitantly dehydrated thereby, which improvement comprises rehydrating the said catalyst to maintain its quality for reuse by withdrawing catalyst from regeneration and admixing same with said relatively cool catalyst from the conversion zone in an amount of the latter sufficient to provide a relatively cool catalyst mass at a temperature at which rehydration can take place, and with a rehydrating agent in an amount sufficient for effecting rehydration of resulting cooled regenerated catalyst, whereby catalyst dehydrated during regeneration is rehydrated and is in condition for return to the said reaction; and still in accordance with another concept, this invention providing a process wherein catalyst containing water of hydration employed in catalytic hydrocarbon cracking and subjected to regeneration at temperatures above cracking temperature, whereby catalyst dehydration takes place, is withdrawn from regeneration and rehydrated by admixing therewith a sufficient amount of relatively cool catalyst from cracking, and steam, below regeneration temperature, to cool regenerated catalyst to hydration temperature not lower than the cracking temperature, whereby rehydration of catalyst from regeneration takes place, and resulting rehydrated catalyst is returned to the cracking step.

Although my invention can be applied to any catalyst requiring hydration, it is advantageously applied to any conversion process wherein a catalyst is employed and contains water of hydration and must be rehydrated at intervals to maintain optimum catalyst quality over prolonged periods, and in this respect it is particularly applicable to natural catalyst employed in conjunction with catalytic hydrocarbon cracking.

The temperature at which substantial dehydration occurs depends on the particular catalyst employed and upon the normal content of water of hydration. Thus, natural catalyst employed in hydrocarbon cracking undergoes dehydration at temperatures in the range of about 1050 to 1060° F. and higher, and it is necessary to effect rehydration at a temperature somewhat lower, such as in the range of 950° to 1050° F. Particularly, for economic reasons, it is advantageous to employ a temperature not lower than the temperature of the cracking to which the catalyst is to be returned, lower temperatures being in no way advantageous and requiring additional heat input to the cracking step to compensate for having cooled the catalyst to below reaction temperature.

Exemplary of catalysts containing water of hydration and which lose water of hydration when subjected to regeneration conditions are natural catalysts, above referred to, which are prepared by chemically processing of naturally occurring clays, such as bentonite, of which montmorillonite is the principal constituent.

Rehydration is effected employing any suitable rehydration agent. Steam is now preferred. The proportion of steam to dehydrated catalyst is dependent, to an extent, on the relative proportion of catalyst from cracking that is employed so as to effect the desired cooling. The proportion of steam employed is at least that sufficient to effect the desired rehydration. Usually at least about one part by weight of steam per 100 parts by weight of dehydrated catalyst is employed to transport and rehydrate the catalyst. In the subsequent example, 0.06 pound of steam for each pound of total rehydrated catalyst were employed. Presently, an amount of steam in the range of 0.004 to 0.16 pound per pound of total rehydrated catalyst is employed.

The amount of catalyst from cracking admixed with catalyst from regeneration to effect cooling of the latter to achieve rehydration temperature above the cracking temperature is at least that amount which in conjunction with added steam provides for the desired cooling for rehydration and is generally in the range of about 0.06 to 5.0, preferably 0.1 to 2.5, and more preferably 0.5 to 1.5, parts by weight per part by weight of regenerated catalyst. Generally, a minimum of steam can be utilized when added to the regenerated catalyst because of the proportion of catalyst added from cracking. Plant operations require a minimum of about one cubic foot of steam (actual quantity at the operating conditions) to transport the solids from the reactor 11 to the rehydrator 28, plus the amount of steam required for rehydration of the total catalyst. Three to five actual cubic feet of steam are usually employed as transfer fluid.

In a specific operation of my process for rehydration of a cracking catalyst, the following operating conditions and data are presented:

| | |
|---|---|
| Reactor temperature, ° F. | 900 |
| Rehydrator temperature, ° F. | 975 |
| Regenerator temperature, ° F. | 1075 |
| Steam temperature, ° F. | 700 |
| Carrier steam, actual cubic feet/# recycle catalyst | 3.0 |
| Water of hydration in the recycled catalyst, wt. percent | 1.0 |
| Water of hydration in the regenerated catalyst | Nil |
| Water of hydration in the rehydrated catalyst, wt. percent | 0.8 |
| Recycle ratio, reactor/regenerator catalyst | 1:1 |

My invention in a preferred form is advantageously applied to natural catalyst employed in cracking feed stocks in the gas oil boiling range, particularly sulfur-bearing gas oils.

My invention is illustrated with reference to the attached drawings, which are diagrammatic representations of two embodiments of the process of my invention. With reference to FIGURE 1, vaporous oil feed, such as a sulfur-bearing vaporized gas-oil boiling in the range of about 400 to 1200° F. and containing from about 0.1 to 1.9 weight percent sulfur, is fed via line 10 into upright cracking chamber 11 through grid 12 in flared end 13 in contact with fluidized natural catalyst under cracking conditions in chamber 11, within a range described hereinabove, advantageously at about 900° F. Dense catalyst phase A in chamber 11 is maintained in the lower central portion thereof as indicated by the dotted line 14. Solids-vapor phase in the upper portion of chamber 11 is, by way of cyclone separator 16, separated into solids returned therefrom via line 17 to the dense phase and vapors substantially free from solids withdrawn via line 18. Hydrocarbon product in line 18 is passed to further processing means not shown.

Catalyst in chamber 11, temporarily spent during cracking therein, is withdrawn via line 19 to line 21 and, together with air as a gas lift from line 22 is passed into regeneration zone 23, wherein combustible materials on the catalyst surfaces are removed under combustion conditions at a temperature in a range of about 1050 to 1090° F., preferably such as at about 1075° F. Temperatures below this level can be employed but result in less efficient regeneration, particularly in respect of longer regeneration time required and in a lesser degree of regeneration achieved due to noncombustion of some of the more difficultly combustible materials. Gas from regeneration is withdrawn from chamber 23 by way of line 24.

Under the conditions described in regenerator 23 the natural catalyst normally utilized in chamber 11 and containing from about 0.8 to 1.0 weight percent of water of hydration, is dehydrated and is withdrawn by way of conduit 26 in wall 27 of regenerator chamber 23 into hydration chamber 28 and therein cooled to a temperature below that at which dehydration takes place and at which rehydration can be effected, i.e., a temperature below about 1050° F., such as about 1000° F. by admixing therewith a sidestream of catalyst temporarily spent in reactor chamber 11, withdrawn by way of line 29 and carried into chamber 28 by way of steam from line 31, the latter utilized also as a rehydration agent in effecting rehydration of catalyst from regeneration, and from the reactor when steam stripping is not used, in chamber 28. The proportions of steam and catalyst from chamber 11, withdrawn via line 29, are those in ranges described hereinabove. In chamber 28, the temperature of regenerated catalyst, having been reduced, such as to about 975° F., rehydration of catalyst with steam takes place quickly so that total catalyst withdrawn from chamber 28 by way of line 32 is substantially completely rehydrated. In any event, rehydration time in chamber 28 is generally in the range of from about 1 to 10 minutes. Residual gas, including any unused steam in chamber 28, is withdrawn by way of cyclone separator 33 through line 34. Gases in line 34 other than any unreacted steam are flue gases that have entered chamber 28 by way of conduit 26.

Rehydrated catalyst in line 32 is discharged into feed line 10 by way of valve 36 and returned thereby for reuse in reaction chamber 11.

With reference to FIGURE 2, which is a diagrammatic drawing representing a unit which is referred to by those skilled in the art as a "stacked" unit, with the reactor mounted above the regenerator, there is presented a second embodiment of my invention. Rehydration of regenerated catalyst, in accordance to the process of my invention, is effected in a similar manner described hereinabove with reference to FIGURE 1. That is, the regenerator is operated at a temperature range of about 1050 to 1090° F., the reactor at about 890 to 925° F., and the rehydrator of my invention at a temperature range of about 950 to 1050° F. for optimum rehydration of the catalyst. In this process, a side stream of temporarily spent catalyst from reactor 11' is withdrawn therefrom by way of line 29' into rehydrator 28'. Also introduced, by way of line 26', into hydrator 28' is a stream of regenerated catalyst from regenerator 23'. Steam, introduced by way of 31', which steam is the rehydrating agent now preferred, enters the lower section of hydrator 28' flowing countercurrently to the mixture of temporarily spent catalyst and regenerated catalyst and effects rehydration thereof to about one percent by weight of the catalyst returned to the reactor 11'. The feed oil stream, which may be similar to the above-referred-to gas oil, and/or residual oil, along with process steam is the transporting fluid for rehydrated catalyst passed from vessel 28' into the reactor 11'.

Reasonable variation and modification are possible within the scope of the foregoing disclosure, the drawing, and the appended claims to the invention, the essence of which is that a catalyst to be hydrated and existing at a temperature above its hydration temperature, is cooled to a hydration temperature level by admixing therewith a relatively cool body of such catalyst to provide a resulting catalyst mixture at hydration temperature, and with a hydrating agent, and is then hydrated; a now preferred concept of the invention relating to rehydration of natural catalyst withdrawn from catalyst regeneration in a hydrocarbon cracking process, particularly in such a process for cracking a sulfur-bearing gas oil and/or residual oil feed stocks.

I claim:

1. In the conversion of reactant materials in presence of a catalyst containing water of hydration, wherein said catalyst is subjected to combustion regeneration at a temperature above the temperature of said conversion to remove combustible materials from its surfaces and is concomitantly dehyrated, the improvement comprising withdrawing first and second streams of catalyst from the zone of said conversion and passing said second stream into the zone of said regeneration, withdrawing said second stream from said zone of regeneration, admixing said first stream of catalyst with said second stream withdrawn from said zone of regeneration in relative proportions to cool the regenerated catalyst to a temperature suitable for rehydration of same, admixing rehydration agent with the resulting admixture of regenerated catalyst and said first stream of catalyst in an amount sufficient to react with the said regenerated catalyst to effect said rehydration, and effecting said rehydration, whereby said regenerated catalyst is in condition for return to said conversion.

2. A process of claim 1 wherein said conversion is hydrocarbon cracking, steam is said rehydration agent, and said catalyst is cooled to a temperature at least as high as that of said cracking.

3. A process of claim 2 wherein said catalyst is a clay type catalyst.

4. A process of claim 1 wherein said conversion catalyst is selected from the group consisting of natural catalyst of which montmorillonite is the principal constituent.

5. A process of claim 1 wherein said rehydration agent is steam.

6. In a catalytic cracking of a sulfur-bearing gas oil boiling in the range of 400 to 1200° F., at a cracking temperature in the range of 890 to 925° F., in presence of natural catalyst containing water of hydration, wherein said catalyst is periodically subjected to combustion regeneration at a temperature above said cracking temperature in the range of about 1050 to 1090° F. to remove combustible materials from its surfaces under which conditions said catalyst becomes dehydrated, the improvement comprising withdrawing first and second streams of catalyst from said cracking zone, passing said second stream of catalyst into said regeneration zone to regenerate said catalyst, withdrawing said second stream of catalyst from said regeneration zone and admixing therewith said first stream of catalyst in the ratio of from 0.06 to 5.0 parts by weight of catalyst in said first stream with one part by weight of catalyst in said second stream withdrawn from said regeneration zone to form an admixture of catalyst at a temperature not lower than the temperature of said cracking, maintaining from 0.004 to 0.16 part by weight of steam in contact with one part by weight of said admixture of catalyst, whereby rehydration of the catalyst takes place, and passing the resulting rehydrated catalyst to said cracking.

7. In a process for cracking a hydrocarbon oil in the presence of a clay type catalyst containing water of hydration wherein said catalyst is regenerated at a temperature above the cracking temperature employed and said water of hydration is lost during regeneration due to the said temperature of regeneration, the improvement comprising withdrawing first and second streams of catalyst from said cracking zone, regenerating said second stream of catalyst in said regeneration zone, withdrawing regenerated catalyst from said regeneration zone and admixing said withdrawn regeneration catalyst with said first stream of catalyst in sufficient proportions to produce an admixture of catalyst of a temperature not lower than said cracking temperature, contacting said admixture of catalyst with steam in a sufficient proportion to rehydrate catalyst contacted therewith, effecting said rehydration, and returning resulting rehydrated catalyst to said cracking.

8. A process of claim 7 wherein said clay type catalyst is natural catalyst.

9. A process of claim 7 wherein said hydrocarbon oil is a gas oil.

10. A process of claim 7 wherein said catalyst is of the group of bentonite clays of which montmorillonite is the principal constituent.

11. A process of claim 7 wherein said hydrocarbon oil is a residual oil.

12. A process of claim 7 wherein said hydrocarbon oil is a mixture of gas oil and residual oil.

References Cited in the file of this patent

UNITED STATES PATENTS

| | | |
|---|---|---|
| 2,389,236 | Payne | Nov. 20, 1945 |
| 2,471,398 | Simpson et al. | May 24, 1949 |
| 2,487,132 | Hemminger | Nov. 8, 1949 |
| 2,526,701 | Shirk | Oct. 24, 1950 |
| 2,539,583 | Kuhn | Jan. 30, 1951 |
| 2,655,464 | Brown et al. | Oct. 13, 1953 |
| 2,700,639 | Weikart | Jan. 25, 1955 |
| 2,760,911 | Fritz et al. | Aug. 28, 1956 |